United States Patent [19]
Stackhouse et al.

[11] Patent Number: 5,740,000
[45] Date of Patent: Apr. 14, 1998

[54] ESD PROTECTION SYSTEM FOR AN INTEGRATED CIRCUIT WITH MULTIPLE POWER SUPPLY NETWORKS

[75] Inventors: Blaine Stackhouse; Gordon Motley, both of Fort Collins, Colo.

[73] Assignee: Hewlett-Packard Co., Palo Alto, Calif.

[21] Appl. No.: 724,595

[22] Filed: Sep. 30, 1996

[51] Int. Cl.[6] .................................................. H02H 9/00
[52] U.S. Cl. .............................................. 361/56; 361/111
[58] Field of Search ............................. 361/56, 91, 111

[56] References Cited

U.S. PATENT DOCUMENTS

| | | | |
|---|---|---|---|
| 5,287,241 | 2/1994 | Puar | 361/56 |
| 5,430,595 | 7/1995 | Wagner et al. | 361/56 |
| 5,485,024 | 1/1996 | Reay | 257/173 |
| 5,515,225 | 5/1996 | Gens et al. | 361/56 |
| 5,530,612 | 6/1996 | Maloney | 361/56 |

OTHER PUBLICATIONS

"ESD Design Methodology", Richard Merril, Enayet Issaq. National Semiconductor Fairchild Research Center, 2900 Semiconductor Drive, Santa Clara, CA 95051; From: EOS/ESD Symposium 93–233; pp. 5B.5.1–5B.5.5 (5 pages).

*Primary Examiner*—Jeffrey A. Gaffin
*Assistant Examiner*—Michael Sherry
*Attorney, Agent, or Firm*—Alexander J. Neudeck

[57] ABSTRACT

An ESD protection system for protecting a CMOS integrated circuit (IC) with multiple power supplies is provided. The ESD protection system uses on-chip diodes to route ESD current from a first IC pin to the main positive power supply, where it is partly absorbed by the parasitic capacitance between the positive supply and ground. A charge sharing diode is provided between the main power supply and the clean power supply networks so that more of the ESD current may be absorbed by the parasitic capacitance between the clean power supply networks and ground. A core shunt circuit, which turns on when an ESD event is sensed, is provided to directly shunt ESD current from the positive supply to ground. Another diode is used to route current from the ground network out a second IC pin.

6 Claims, 3 Drawing Sheets

ESD PROTECTION SYSTEM FOR AN INTEGRATED CIRCUIT WITH MULTIPLE POWER SUPPLY NETWORKS

FIELD OF THE INVENTION

The present invention relates to MOS integrated circuits and particularly to an electrostatic discharge (ESD) circuit for protecting MOS devices from high energy electrical transients. More particularly, this invention relates to an ESD protection circuit which is able to provide ESD protection for a high pin count integrated circuit with multiple on-chip power supply networks and which is implemented without using special semiconductor devices.

BACKGROUND OF THE INVENTION

MOS devices are commonly used to implement logic and memory functions in integrated circuits. In particular, CMOS devices have become the standard in the computer industry. To maximize yield and long term reliability, some provision for the handling of ESD potentials applied to the terminals of these integrated circuits must be made.

ESD potentials may be several orders of magnitude larger than potentials ordinarily applied to the terminals of a device. These high potentials may lead to the damage or destruction of the device. Typically, the damage to the device resulting from an ESD event is the breakdown of the oxide layer in the vicinity of the gate of a MOS device. Therefore, it is necessary to prevent the high potentials of an ESD event from reaching the gate of a MOS device.

One approach is to implement output drivers which are designed to shunt ESD current through the channel of a driver transistor to the substrate during an ESD event. There are several disadvantages to this approach. First, in order to handle large ESD currents, the physical implementation of the output drivers must be large. Since a typical chip has a large number of output drivers, this approach has a significant negative impact on chip size and hence, chip cost. Second, this approach requires the output drivers themselves to carry the ESD current. Therefore, these devices will be the first to fail rendering the entire chip unusable. Finally, the output drivers see high enough voltages during an ESD event to go into snapback and second breakdown. These regions of operation are poorly modeled and difficult to simulate which makes it hard to estimate the level of ESD protection prior to constructing the device.

Another approach uses special semiconductor devices such as low voltage semiconductor controlled rectifiers (LVSCR's), or grounded gate protection devices to shunt ESD currents. The performance of these devices depends on the particular IC fabrication process used which means they are not easily portable between IC fabrication processes or from one generation of IC fabrication process to the next. In addition, some implementations of these devices have undesirable characteristics, such as excessive leakage currents, or they clamp high input voltages which are not ESD events. Finally, LVSCR's tend to be slow to turn on during an ESD event which may result in damage to the device they are trying to protect.

Another approach routes ESD charge to the main power supply network. Since an ESD source is primarily capacitive, this has a charge sharing effect between the capacitance of the ESD source and the large parasitic capacitance of the main power supply network. Although this charge sharing effect is not sufficient by itself, it reduces the size of the ESD potential inside the chip which allows other ESD protection devices to function better.

Unfortunately, many chips have multiple power supplies. Each of these additional power supplies reduces the parasitic capacitance that would otherwise be on a single main power supply network because they reduce the amount of circuitry connected to the main power supply network. In the case of high density circuitry powered by clean supplies, such as static RAM's, the amount of parasitic capacitance now on the clean supply may be a significant percentage of the total parasitic capacitance on all of the power supply networks. The split supplies can lead to a significant rise in the ESD potential inside the chip because the parasitic capacitance now on the clean supply network can no longer absorb some of the ESD charge.

Accordingly, there is a need in the art for an ESD protection system which does not shunt the current through the output driver transistors. It is desirable that such an ESD system be implemented using standard devices that are well characterized in a MOS IC fabrication process. It is also desirable that such an ESD system work on an IC with a large number of I/O pads, and in particular, multiple on-chip power supply networks.

SUMMARY OF THE INVENTION

The ESD protection system of the present invention provides a robust current path between any two pins of a multi-supply IC without involving any circuitry critical to the function of the chip, or using any fabrication process specific devices. Silicon diodes, the parasitic capacitance of the chip's core circuitry powered by the main supply voltage, the parasitic capacitance of the chip's circuitry powered by any clean supply voltages, and core shunt circuits are used to lower ESD voltages and route ESD currents around functional circuitry. By sharing the ESD charge with the large parasitic capacitance of the chip's core, the ESD potential is significantly reduced. Furthermore, the present invention is capable of sharing the ESD charge with the parasitic capacitance of circuitry powered by the clean supply voltages. Sharing the ESD charge with this additional capacitance reduces the ESD potential even further to produce a more reliable system, and reduces reliance on the core shunt circuits.

The core shunt circuits turn on during an ESD event to provide a low impedance current path between power supply networks. During normal operation, the core shunt circuit is off, and no current flows through the core shunt circuit. The core shunt circuit detects rapid increases in the positive supply voltage (VDD) with respect to the negative supply voltage (GND) which are characteristic of an ESD event, and turns on when they occur. Silicon diodes, which are either parasitic to other devices or deliberately placed across certain nodes, ensure that ESD events are either shunted to the substrate directly, or are directed to the positive supply to be shunted by a core shunt circuit. The present invention also places diodes between the main supply network and the clean supply networks to allow the ESD charge to be shared with the parasitic capacitance on the clean supply network, and to prevent the voltage on the clean supply network from drooping excessively below the main supply network.

DETAILED DESCRIPTION OF THE PREFERRED EMBODIMENTS

Figure 1:
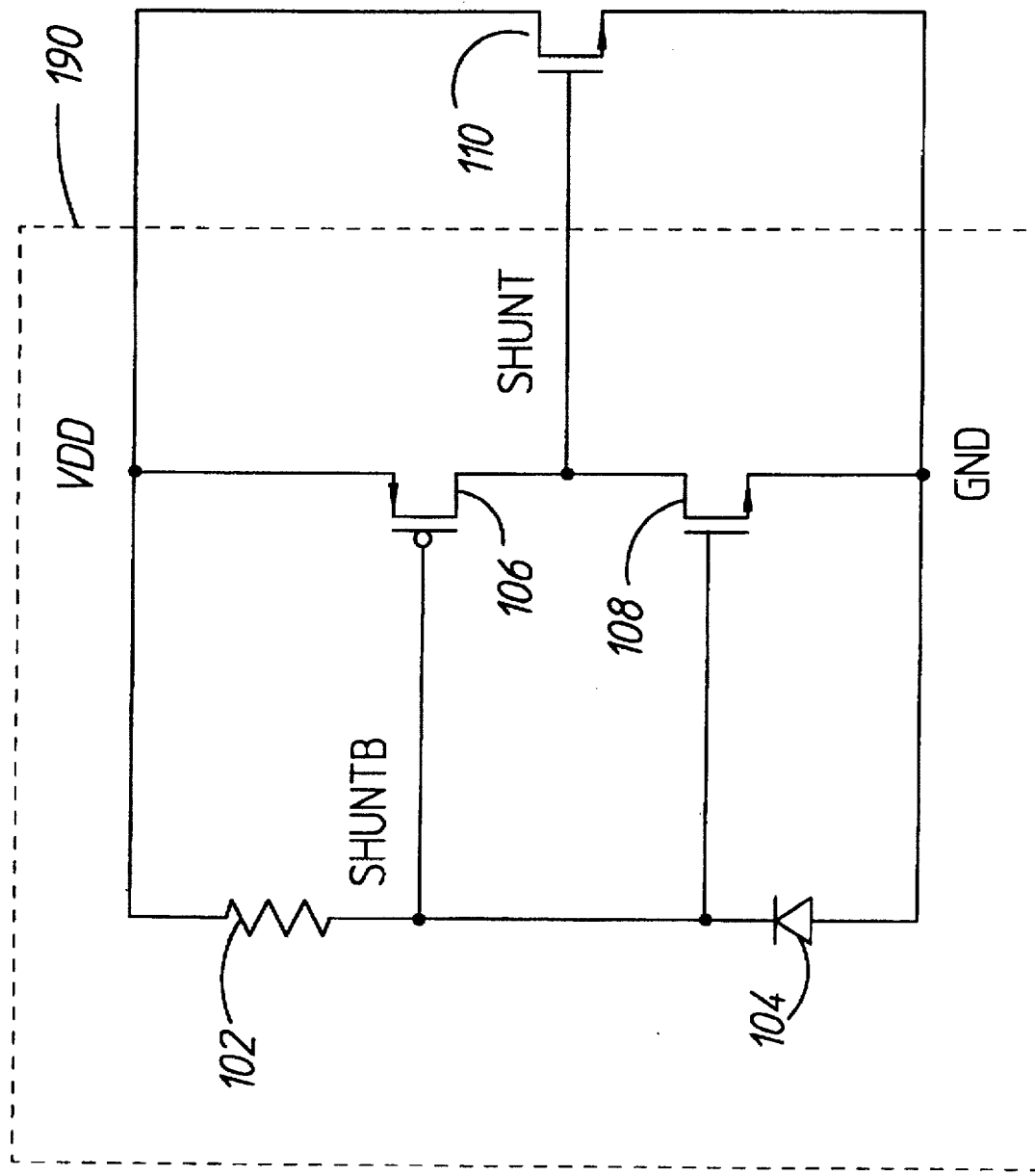
FIG. 1 is a schematic illustration of a core shunt circuit.

FIG. 1 illustrates an embodiment of the core shunt circuit. The core shunt circuit operates to conduct current from the positive supply node (VDD) to the negative supply, or substrate node (GND), during an ESD event. The core shunt circuit is comprised of an n-channel field effect transistor (NFET) 110 which has its drain connected to VDD, and its source connected to GND. This NFET is controlled by a control circuit shown in box 190 which turns NFET 110 on when the voltage on VDD rises a large amount, very quickly. The gate of NFET 110 is connected to node SHUNT. Node SHUNT is connected to the drain of a p-channel field effect transistor (PFET) 106, and the drain of NFET 108. The source of PFET 106 is connected to VDD, and the source of NFET 108 is connected to GND. The gates of transistors 106 and 108 are both connected to node SHUNTB. Accordingly, transistors 106 and 108 form an inverting amplifier with node SHUNTB as the input and node SHUNT as the output. Resistance 102 is connected between node SHUNTB and VDD. In the preferred embodiment, resistance 102 is a 200KΩ well resistor. Diode 104 is connected between SHUNTB and GND such that diode 104 will be reverse biased when node SHUNTB is at a higher voltage than GND. In operation, element 104 acts as a capacitance of approximately 3 pF. A diode is used in the preferred embodiment because a diode capacitance is more insensitive to voltage spikes which would cause damage to gate oxide capacitors.

When an ESD event occurs, the supply node VDD rises rapidly. Resistance 102 and diode 104 acting as a capacitance, act as an RC network charging node SHUNTB at a much slower rate than VDD is rising. This forms a voltage differential between VDD and node SHUNTB. This voltage differential turns PFET 106 on, which pulls node SHUNT towards VDD, which turns NFET 110 on, shunting ESD current from VDD to GND through NFET 110. The capacitance of diode 104 keeps the voltage on node SHUNTB close to GND which prevents NFET 108 from turning on.

When the chip powers up normally, VDD rises much slower than it would during an ESD event. In this case, the RC network of resistance 102 ,and diode 104, charge node SHUNTB at about the same rate as VDD is rising. Therefore, the voltage on node SHUNTB closely tracks VDD, and PFET 106 remains off. As the voltage on node SHUNTB rises, it turns NFET 108 on, which holds node SHUNT close to GND, ensuring that NFET 110 remains off.

Figure 2:
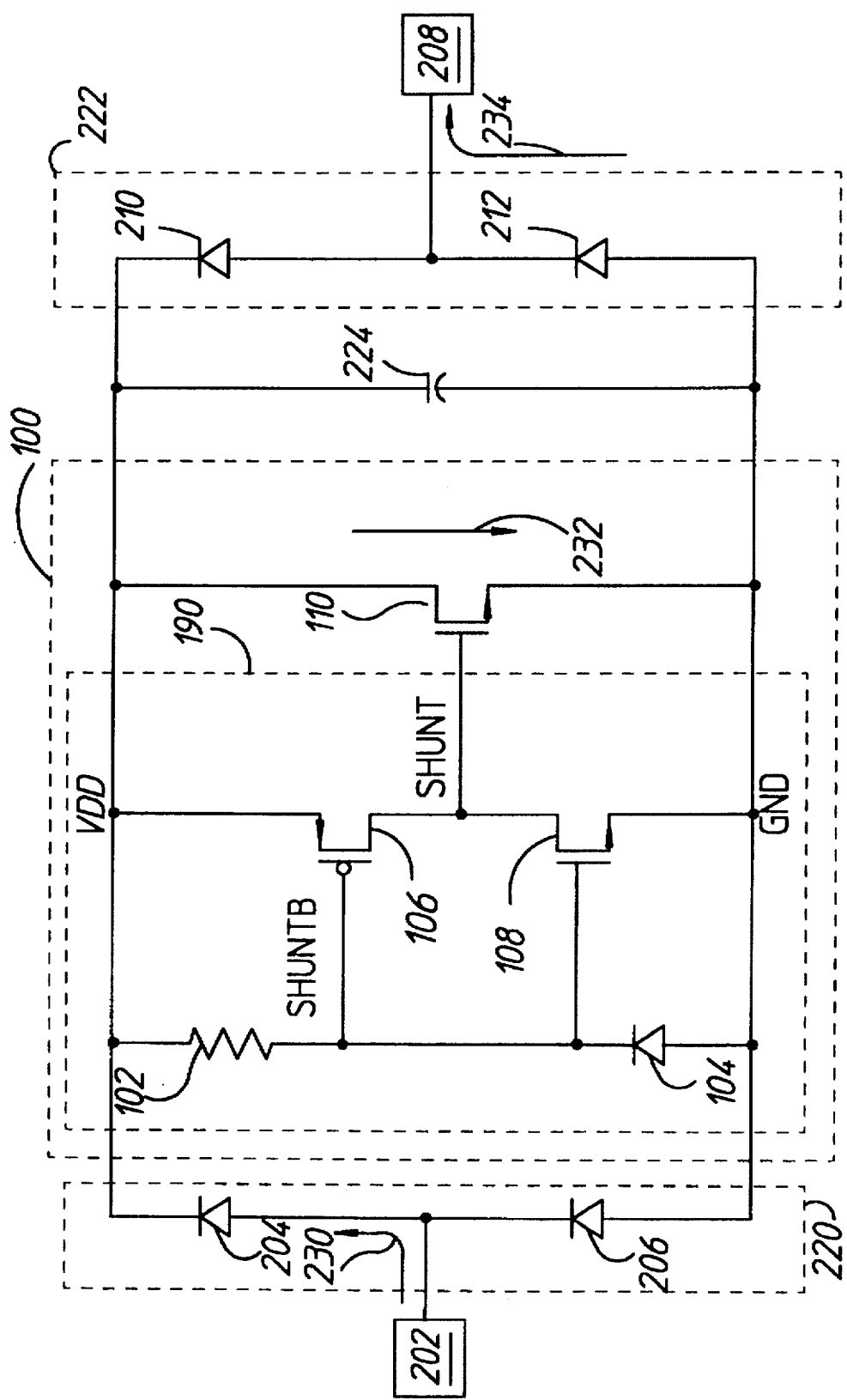
FIG. 2 is a representative schematic illustration of the ESD protection system functioning between an arbitrary choice of two pins.

FIG. 2 is a representative schematic illustration of the ESD protection system functioning between an arbitrary choice of two pins. Contained in box 100 is the core shunt circuit of FIG. 1. There may be any number of core shunt circuits distributed around the chip connected between the main supply networks. Also shown in FIG. 2, connected between VDD and GND, is core capacitance 224. The core capacitance 224 represents all the parasitic capacitances, and any power supply bypass capacitances, between the main power supply networks.

In FIG. 2 are two arbitrary pins, or pads, 202, 208. These pins may be input/output, input only, output only, dirty supply, clean supply, or any other type of chip pin. These pins are each connected to two diodes. Pin 202 is connected to diodes 204 and 206. These diodes, enclosed in box 220 form the part of the ESD protection system associated with pin 202. Diode 204 is connected between pin 202 and VDD to conduct current from pin 202 to VDD when diode 204 is forward biased. Diode 206 is connected between pin 202 and GND to block current from flowing between pin 202 and GND when diode 206 is reversed biased.

Pin 208 is connected to diodes 210 and 212. These diodes, enclosed in box 222 form the part of the ESD protection system associated with pin 208. Diode 210 is connected between pin 208 and VDD to conduct current from pin 208 to VDD when diode 210 is forward biased. Diode 212 is connected between pin 208 and GND to block current from flowing between pin 208 and GND when diode 212 is reversed biased, and to conduct current from GND to pin 208 when diode 212 is forward biased.

In the case of an input/output or output only pin which uses VDD as its positive output supply voltage, diodes 204, 206, 210, and 212 may be parasitic diodes contained in the output driver transistors, or some other product of the IC fabrication process. For clean and dirty supply pins, and/or input only pins, or I/O pins connected to dirty supplies, diodes 204, 206, 210, and 212 may be non-parasitic devices which are added to the IC design.

To illustrate the operation of the system, assume that an ESD event occurs between pins 202 and 208. Further assume that the ESD event presents a voltage which causes pin 202 to be positive with respect to pin 208. The ESD event causes the voltage on pin 202 to rise above VDD forward biasing diode 204. This allows the ESD current to take the path indicated by arrow 230 flowing from pin 202 through diode 204 to the VDD node. This current causes a rapid rise in the voltage on the VDD node, which turns on the core shunt circuit. When the core shunt circuit turns on, ESD current flows from VDD to GND through NFET 110 as indicated by arrow 232. The current through the core shunt circuit causes the voltage on node GND to rise above pin 208, which forward biases diode 212. The ESD current passes through diode 212 as indicated by arrow 234 and exits the IC through pin 208.

Due to the symmetry of the system, the polarity of the ESD event does not matter. If the ESD event presented a voltage which caused pin 208 to be positive with respect to pin 202, the ESD current would pass through diode 210, the core shunt circuit, diode 206, and exit through pin 202. An ESD event between a pin connected to VDD, and a pin connected to ground, would either be shunted through the core shunt circuit, travel through diodes 206 and 204 in series, or diodes 212 and 210 in series, or both, or travel through parasitic diodes associated with other devices.

Note that in all cases, the ESD currents were not routed through any active circuitry which is critical to the function of the device, such as the output transistors. The silicon diodes 204, 206, 212, and 210, whether parasitic or not, may be easily fabricated to withstand the currents inherent in an ESD event. The only active device which is submitted to the currents of an ESD event is transistor 110. Since its only function is to shunt current during an ESD event, transistor 110 may fail without affecting the function of the chip. In the preferred embodiment, numerous core shunt circuits are placed liberally around the IC such that the failure of one, two, or even more, would not affect the ESD resistance of the entire integrated circuit.

Figure 3:
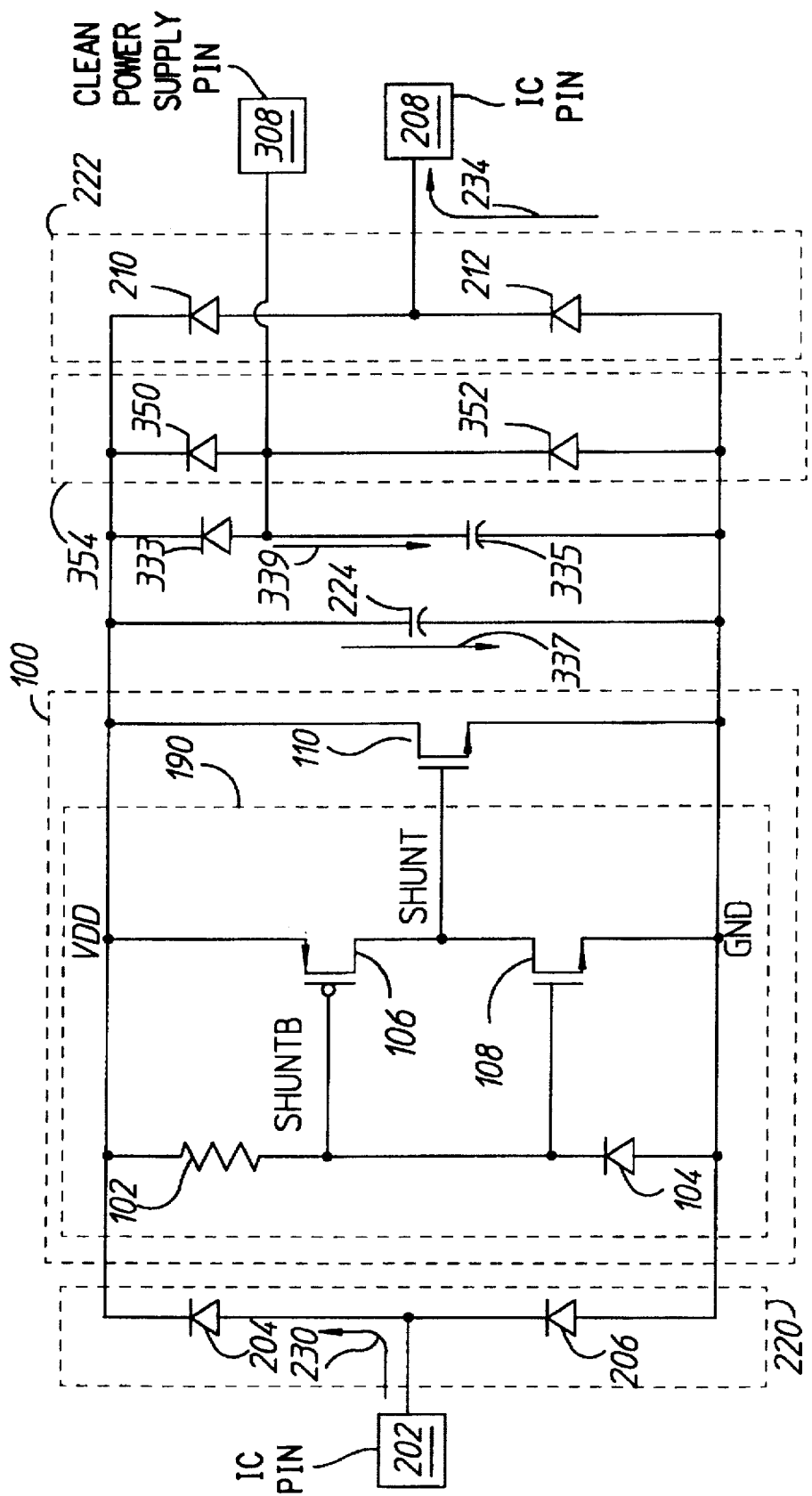
FIG. 3 is a representative schematic illustration of the ESD protection system showing how the ESD charge is shared with the parasitic capacitance of a clean supply network.

FIG. 3 shows how the ESD charge is shared with the parasitic capacitance of a clean supply network. Like FIG. 2, FIG. 3 shows pins 202 and 208, and their respective ESD protection diodes in boxes 220 and 222, respectively. Also shown in FIG. 3 is the core shunt circuit in box 100. FIG. 3 further shows a clean supply pin 308 and its protection diodes, 350 and 352, inside of box 354. Connected between VDD, the main supply, and the clean supply pin is diode 333. The cathode of diode 333 is connected to clean supply pin 308 to allow current to flow from VDD to the clean supply network when diode 333 is forward biased. Shown between the clean supply pin 308 and GND is capacitance 335. Capacitance 335 represents the parasitic capacitance of the dean supply network.

To illustrate the operation of the system, assume that an ESD event occurs between pins 202 and 208. Further assume that the ESD event presents a voltage which causes pin 202 to be positive with respect to pin 208. The ESD event causes the voltage on pin 202 to rise above VDD forward biasing diode 204. This allows the ESD current to take the path indicated by arrow 230 flowing from pin 202 through diode 204 to the VDD node. When the core shunt is not on, current is not flowing through transistor 110. Instead, the ESD current charges up core capacitance 224. Core capacitance 224 is the parasitic capacitance associated with the main power supply network. ESD current flows through capacitance 224 from VDD to GND as indicated by arrow 337. ESD current may also flow through the core shunt transistor 110 once it is on. It then flows from GND through diode 212 and out pin 208 as indicated by arrow 234.

As current flows from VDD to GND through capacitance 224, it charges that capacitance. This causes the voltage on VDD to rise. Once the voltage on VDD has risen sufficiently above the voltage on the dean supply pin 308, diode 333 is forward biased. This allows ESD current to flow through the parasitic capacitance of the clean supply network 335 as shown by arrow 339. Therefore, the charge from the ESD event is shared between the core capacitance 224 and the capacitance of the dean supply network 335. The additional capacitance of the dean supply network helps absorb more ESD charge with less voltage rise on VDD than would otherwise be possible without diode 333. This improves the performance of the ESD system because smaller voltages appear on VDD during an ESD event. Smaller voltages on VDD during an ESD event lessens the amount of current the core shunt circuit, and transistor 110 in particular, must carry.

The system described above may be implemented by placing the appropriate diodes on both supply and signal pins. Therefore, a chip with multiple powers supplies may be protected by adding two diodes connected to each of the supplemental supply pins. One diode is connected with its cathode connected to GND, and its anode connected to the pin. The other diode is connected with its cathode connected to the pin and its anode connected to the main supply network. In this same manner, an input only signal pin may be protected. Accordingly, this system provides a simple, reliable way of protecting a chip with multiple power supplies.

The only devices required for each pin are diodes. On output only and I/O pads, these diodes may already be present as parasitic devices. Therefore, no additional chip space is required to fabricate these devices. For each supply pin, diodes must be added to the design. These diodes, however, require no additional space since they may be placed where the output transistors would have been placed if the supply pin was an I/O pin, or under the distribution networks of the supplemental supplies. The core shunt circuits also don't occupy any additional circuit area since they may be fabricated underneath the major power busses which distribute VDD or GND around the chip. Since this system takes little or no additional space per pin, it is ideal for large pin count integrated circuits.

Finally, this system uses no non-standard devices such as LVSCK's. This simplifies the task of modeling and simulation. Only standard device models for resistors, diodes, capacitors, and transistors are necessary. The system may be migrated from process to process and chip to chip simply by extracting a new resistance model for the major ESD current paths and re-simulating. If simulation shows a failure will occur, the problem may be fixed and re-simulated before the chip is ever fabricated.

It is to be understood that the claimed invention is not to be limited by the preferred embodiments but encompasses other modifications and alterations within the scope and spirit of the inventive concept. For example, a diode was used in the core shunt circuit as a capacitance in an RC network. This could easily have been an MOS capacitor, or a capacitor fabricated from two metal interconnect layers. Also, the resistance 102 was a 200K$\Omega$ well resistor. Resistance 102 could be replaced by an appropriately designed transistor or active circuit.

What is claimed is:

1. An ESD protection system for an integrated circuit (IC) with multiple power supplies, comprising:
   a ground network;
   a first power supply network;
   a second power supply network;
   a first ESD current routing circuit for conducting ESD current from a first IC pin to said first power supply network;
   a second ESD current routing circuit for conducting ESD current from said ground network to a second IC pin;
   a charge sharing circuit for conducting ESD current from said first power supply network to said second power supply network;
   wherein said charge sharing circuit comprises a charge sharing diode having an anode connected to said first power supply network and a cathode connected to said second power supply network.
   wherein said first ESD current routing circuit comprises a first diode having an anode connected to said first IC pin and a cathode connected to said first power supply network, and
   wherein said second ESD current routing circuit comprises a second diode having an anode connected to said ground network and a cathode connected to said second IC pin,
   wherein said core shunt comprises,
      a switch connected between said first power supply network and said ground network;
      a CMOS amplifier having an input and an output, said output being coupled to said switch;
      timing resistance between said main power supply network and said input; and,
      a timing capacitance between said input and said ground network.

2. The ESD protection system of claim 1, wherein said timing capacitance is provided by a diode.

3. An ESD protection system for an integrated circuit (IC) with multiple power supplies, comprising:
   a ground network;
   a main power supply network having a parasitic capacitance between said main power supply network and said ground network;
   a clean power supply network having a parasitic capacitance between said clean power supply network and said ground network;
   a first IC pin;

a second IC pin;

a first diode, said first diode having its anode connected to said ground network and its cathode connected to said first IC pin;

a second diode, said second diode having its anode connected to said first IC pin and its cathode connected to said main power supply network;

a third diode, said third diode having its anode connected to said ground network and its cathode connected to said second IC pin;

a fourth diode, said fourth diode having its anode connected to said second IC pin and its cathode connected to said main power supply network;

a core shunt means for conducting charge from said main power supply network to said ground network during an ESD event; and a charge sharing diode having its anode connected to said main power supply network and its cathode connected to said clean supply network.

4. The ESD protection system of claim 3, wherein said core shunt means comprises:

a switching means connected between said main power supply network and said ground network; and a control means which turns said switching means on when rapid, large scale voltage rises are detected on said main power supply network.

5. The ESD protection system of claim 4, wherein said control means comprises:

a CMOS amplifier having an input and an output, said output being coupled to said switching means;

a timing resistance between said main power supply network and said input; and a timing capacitance between said input and said ground network.

6. The ESD protection system of claim 5, wherein said timing capacitance is provided by a diode.

* * * * *